US011429966B1

(12) United States Patent
Adam (10) Patent No.: US 11,429,966 B1
(45) Date of Patent: Aug. 30, 2022

(54) DYNAMIC CODE PAYMENT CARD VERIFICATION METHODS AND SYSTEMS

(71) Applicant: UIPCO, LLC, San Antonio, TX (US)

(72) Inventor: Patrick Adam, Helotes, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 462 days.

(21) Appl. No.: 15/823,349

(22) Filed: Nov. 27, 2017

(51) Int. Cl.
*G06Q 20/40* (2012.01)
*G06Q 20/32* (2012.01)
*G06Q 20/34* (2012.01)
*G06Q 20/38* (2012.01)

(52) U.S. Cl.
CPC ......... *G06Q 20/401* (2013.01); *G06Q 20/356* (2013.01); *G06Q 20/409* (2013.01)

(58) Field of Classification Search
CPC .............................................. G06Q 20/00–425
See application file for complete search history.

(56) References Cited

U.S. PATENT DOCUMENTS

| | | | | |
|---|---|---|---|---|
| 8,365,988 B1 * | 2/2013 | Medina, III | ......... | G06Q 20/322 235/380 |
| 8,893,250 B2 * | 11/2014 | Mattsson | ............. | G06F 21/606 726/9 |
| 9,195,981 B2 * | 11/2015 | Annan | ................. | G06Q 20/322 |
| 10,462,152 B2 * | 10/2019 | Edwards | ............. | H04L 63/0815 |
| 2012/0143754 A1 * | 6/2012 | Patel | .................. | G06Q 20/4018 705/41 |
| 2014/0067675 A1 * | 3/2014 | Leyva | .............. | G06Q 20/38215 705/44 |
| 2014/0279555 A1 * | 9/2014 | Guillaud | ............... | G07F 7/0866 705/67 |
| 2015/0112870 A1 * | 4/2015 | Nagasundaram | .... | G06Q 20/401 705/67 |
| 2015/0206147 A1 * | 7/2015 | Stanfield | ................ | G06Q 20/24 705/41 |
| 2016/0294837 A1 | 10/2016 | Turgeman | | |
| 2017/0221047 A1 * | 8/2017 | Veerasangappa Kadi | ................... | G06Q 20/352 |
| 2018/0276669 A1 * | 9/2018 | McIntyre | ........... | G06Q 20/4016 |

(Continued)

OTHER PUBLICATIONS

White, Ron, "How Computers Work," Oct. 2003, 7th Edition, Year: 2003, 23 pages.

*Primary Examiner* — John W Hayes
*Assistant Examiner* — Chenyuh Kuo
(74) *Attorney, Agent, or Firm* — Perkins Coie LLP (57) ABSTRACT

Embodiments described herein disclose methods and systems for authorizing a payment card transaction using dynamic codes. The system can issue a payment card to a user. The payment card can be associated with a verification application accessible by a device associated with the user. The verification application can include a dynamic code associated with the payment card. The system can receive a request for authorization for a transaction using the payment card from a remote computing device, and the request can include an identifier of the payment card and a verification code. The system can identify the payment card using the identifier of the payment card and can compare the verification code with a value of the dynamic code at the time of the transaction. The system can authorize the transaction when the verification code matches the value of the dynamic code at the time of the transaction.

8 Claims, 5 Drawing Sheets

(56) References Cited

U.S. PATENT DOCUMENTS

2018/0285864 A1* 10/2018 Dill ........................ G06Q 20/40
2019/0005495 A1* 1/2019 Chen ....................... G07F 7/082

* cited by examiner

DYNAMIC CODE PAYMENT CARD VERIFICATION METHODS AND SYSTEMS

BACKGROUND

Payment card transactions come with inherent risk that an unauthorized person can use the payment card. To combat fraudulent transactions, most payment cards include two types of credit verification values (CVV). The first type of CVV is called CVV1 (also known as SCV, CVC1, and CSC) and is used for transactions in which the card is present (i.e., card present transactions or CP transactions) because this CVV is encoded into the magnetic stripe of the payment card and the CVV is automatically retrieved when the magnetic stripe of a card is swiped on a point-of-sale device and is verified by the issuer.

The second type of CVV is called CVV2 (also known as CID, CSC, CID, CVC2, and unique card code) and is used for transactions in which the cardholder does not or cannot physically present the card for a merchant's visual examination at the time of payment or when the order is given and payment effected (e.g., mail-order transactions, over the telephone transactions or Internet transactions). Such transactions are called card not present transactions (CNP). CNP transactions are even more fraught with fraud because merchants cannot verify that the actual cardholder is indeed authorizing a purchase or even have the card in hand. Thus, the CVV2 is an anti-fraud security feature to help verify CNP purchases are authorized. For Visa/MasterCard, the CVV2 is a three-digit CVV number printed on the back of the card and cardholders are often asked to provide the CVV2 during CNP transactions.

The CVV is helpful in preventing fraud but has its limitations that allow for unauthorized transactions and that may require new cards to be sent to customers, both of which can be costly for financial institutions. For example, the CVV2 expires within a certain timeframe, requiring a new card to be sent to the cardholder upon expiration. Also, if the CVV2 has been compromised (e.g., data breach, card taken from mail), the financial institution will send a new card to the cardholder.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In typical payment card transactions, a CVV or CVV2 included on the payment card (i.e., in the magnetic stripe or printed on the back of the card) is provided to the payment card issuer to prevent an unauthorized user from using the payment card. Embodiments for authorizing a payment card transaction using a dynamic code that is not included on the payment card are disclosed.

A payment card issuer can issue a payment card to a user. Instead of being associated with a CVV or CVV2 (or similar security measures), the payment card can be associated with a dynamic code or token that the user can provide when requesting a transaction that uses the payment card. The dynamic code can be generated by the payment issuer system (or a third party) and can be provided to the user via a verification application on the user's device. The dynamic code can be, for example, three or four digits and can be changed periodically, randomly, or upon request. The dynamic code can remove the need for a CVV1 (or similar code such as CVC1) or CVV2 (or similar code such as CVC2 or CID) on the payment card, and in some embodiments, can remove the need for an expiration date on the card. Because the CVV1 numbers are not displayed on the payment card (i.e., they reside on the magnetic strip), the issuer of the payment card may choose not to remove the CVV1. However, removing the CVV1 from the magnetic strip prevents fraudsters from duplicating the magnetic strip.

When requesting a transaction, the user can provide the dynamic code (referred to as a verification code when provided to the merchant system) to the merchant system, which in turn passes the verification code along with other transaction information to the payment card issuer system for authorization for the transaction. The payment card issuer system can obtain the value of the dynamic code at the time of the transaction (i.e., the dynamic code that was active when the merchant sent the authorization request) and compare it to the verification code provided by the user to the merchant. The payment card issuer system can send an authorization to the merchant system when the verification code matches the dynamic code that was active at the time of the transaction.

The dynamic code can be used in CNP transactions (e.g., input into a merchant website, spoken or provided over the phone) or during CP transactions (e.g., input into a kiosk at a physical location of the merchant).

This disclosure describes systems and processes designed to provide a more secure payment card transaction by using a dynamic code. Various embodiments may provide one or more of the following technological improvements: (1) increase security by removing the physical numbers from the card so that fraudulent CNP transactions are not authorized; (2) increase security of CNP and CP transactions by requiring access (and possibly additional authentication such as a PIN) to a device associated with the cardholder; and (3) reduce fraudulent transactions by refreshing a dynamic code periodically, on-demand, or randomly.

In the following description, for the purposes of explanation, numerous specific details are set forth in order to provide a thorough understanding of embodiments of the present technology. It will be apparent, however, that embodiments of the present technology may be practiced without some of these specific details

Suitable System

Figure 1:
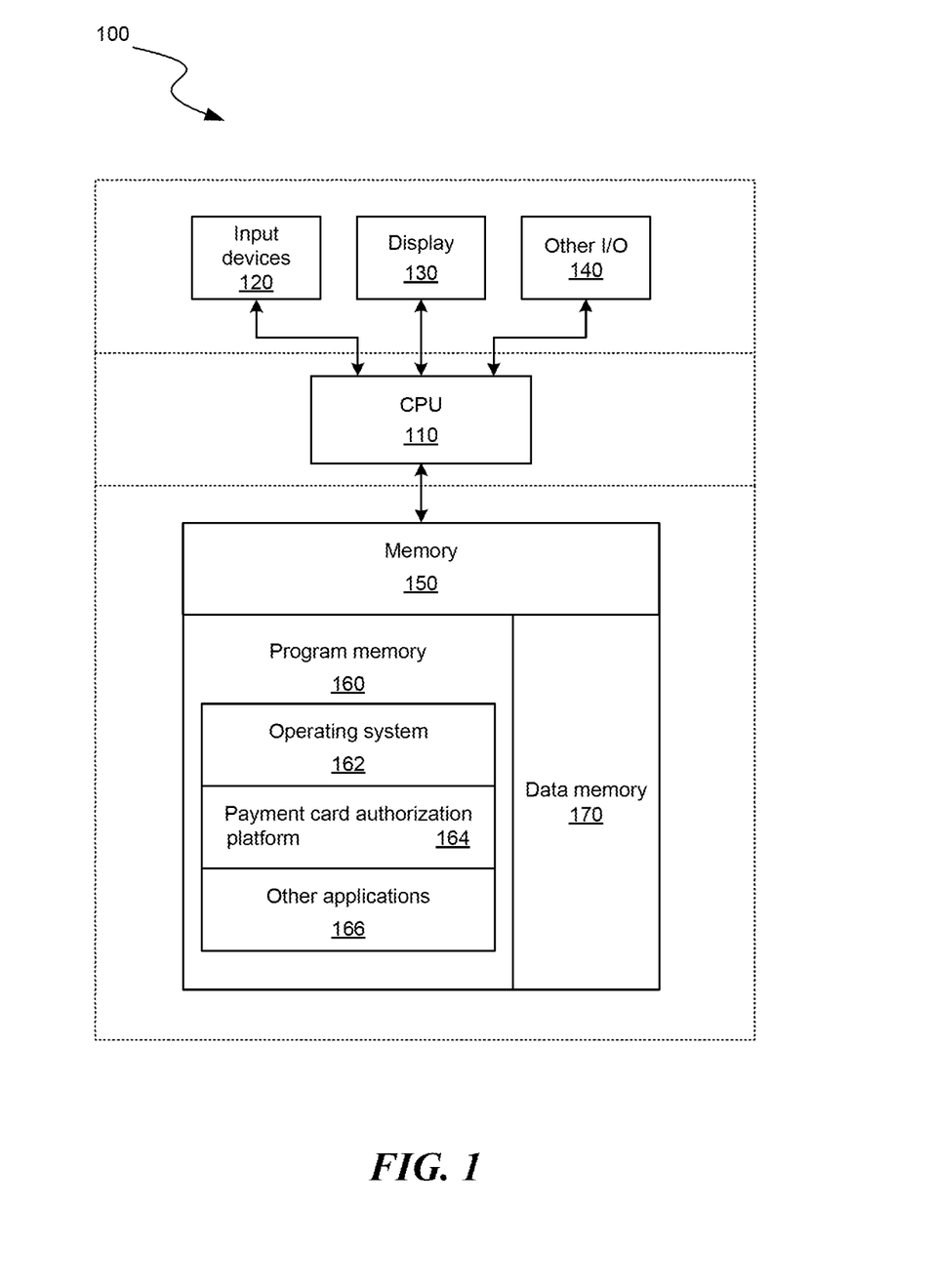
FIG. 1 is a block diagram illustrating an overview of devices on which some implementations can operate.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that manage payment card transaction authorizations. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display 130 is separate from the input device. Examples of display devices are: a LCD display screen; a LED display screen; a projected, holographic, or augmented reality display (such as a heads-up display device or a head-mounted device); and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory 150 includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 150 is not a propagating signal divorced from underlying hardware; a memory is thus non-transitory. A memory 150 can include program memory 160 that stores programs and software, such as an operating system 162, payment card authorization platform 164, and other application programs 166. A memory 150 can also include data memory 170 that can include payment card identifiers, user identifying information such as addresses or zip codes, whether the user has installed the verification application on a device, dynamic codes, historical transaction information, expiration dates etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
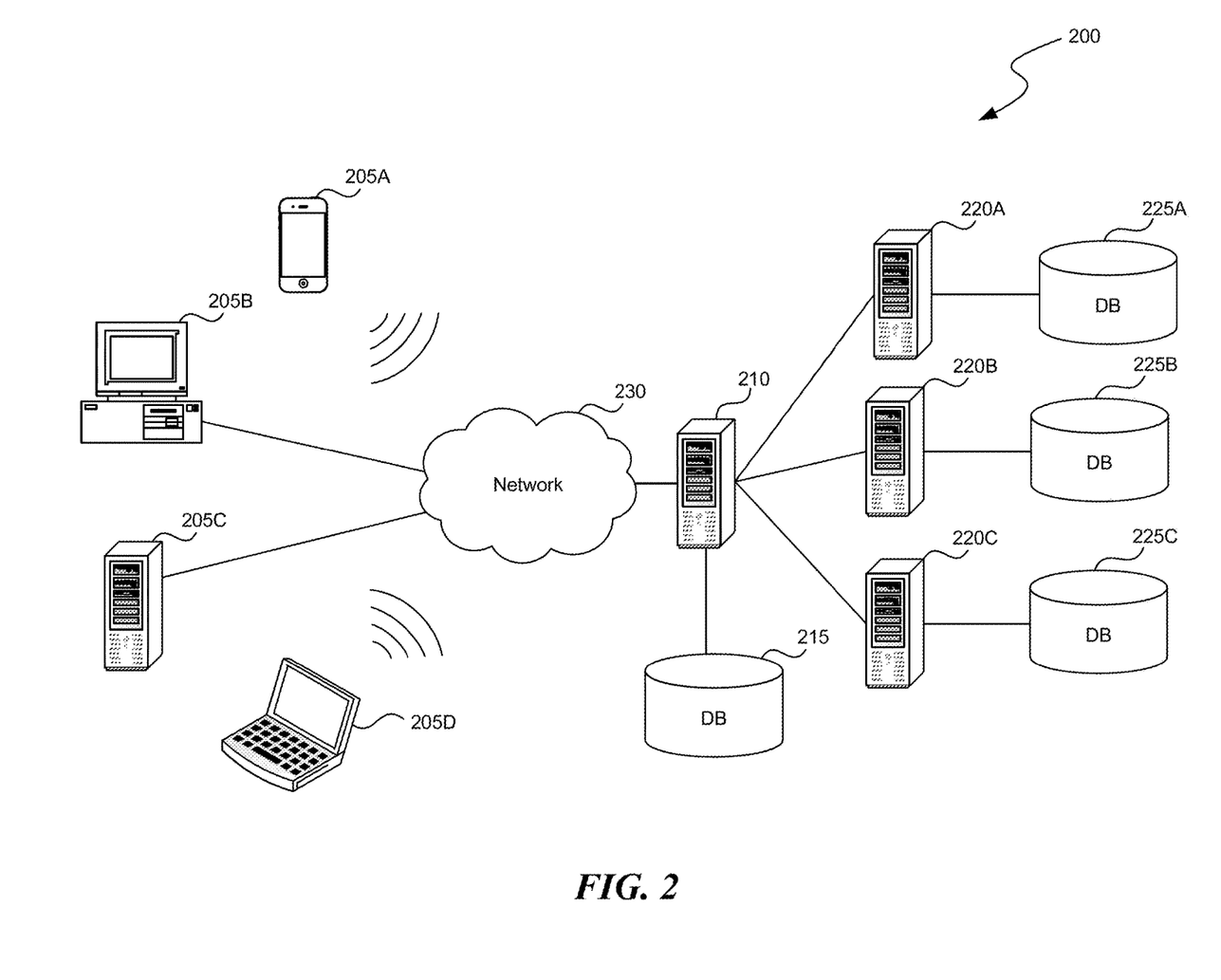
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210.

In some implementations, server computing device 210 can be an edge server that receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server computing device 220 corresponds to a group of servers.

Client computing devices 205 and server computing devices 210 and 220A-C can each act as a server or client to other server/client devices. Server 210 can connect to a database 215. Servers 220A-C can each connect to a corresponding database 225A-C. As discussed above, each server 220A-C can correspond to a group of servers, and each of these servers can share a database or can have their own database. Databases 215 and 225 can warehouse (e.g., store) information such as payment card identifiers, user information, dynamic codes, payment card information, historical transaction information, and expiration dates. Though databases 215 and 225A-C are displayed logically as single units, databases 215 and 225A-C can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205A-D can be connected to network 230 through a network interface, such as by wired or wireless communication. While the connections between server 210 and servers 220A-C are shown as separate connections, these connections can be any kind of local, wide area, wired, or wireless network, including network 230 or a separate public or private network.

Figure 3:
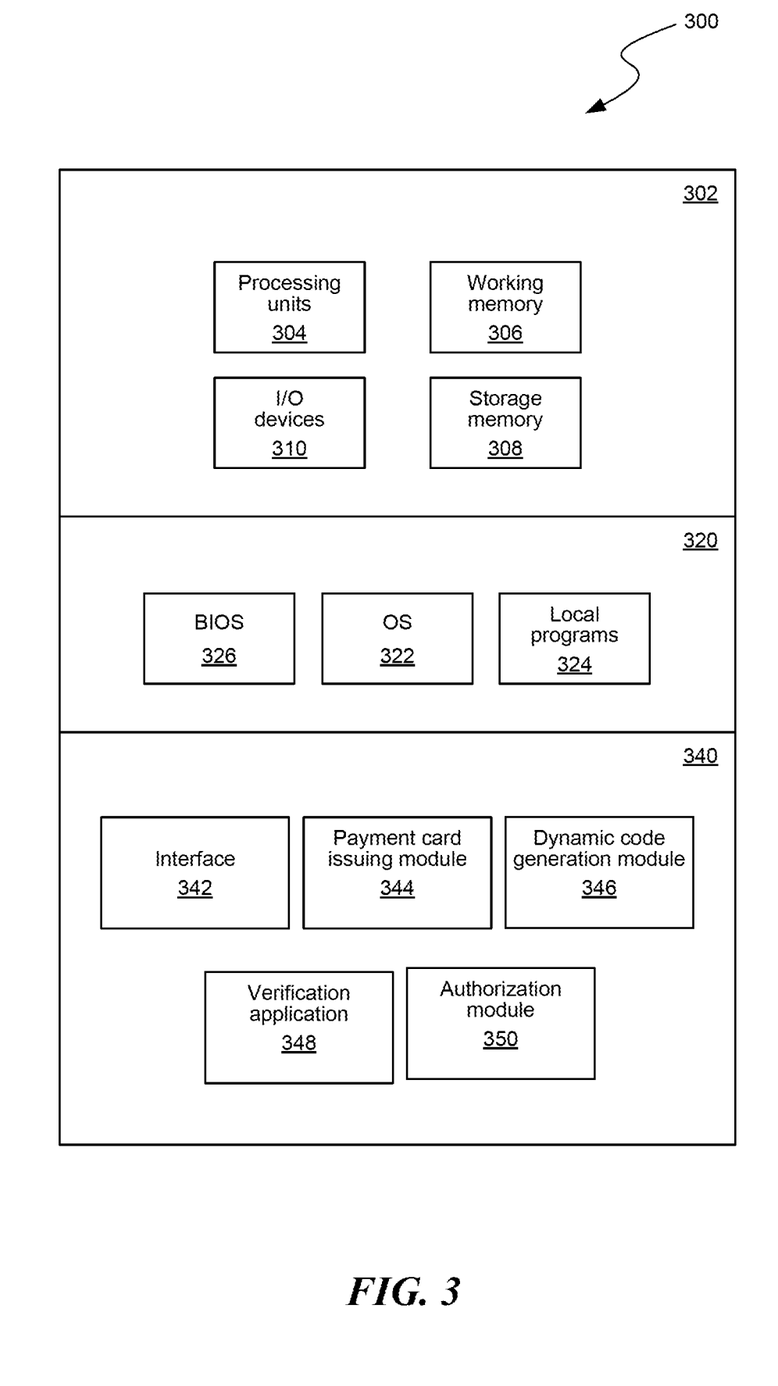
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310.

Components 300 can be implemented in a client computing device such as client computing devices 205 or on a server computing device, such as server computing device 210 or 220A-C. In some embodiments, some components of components 300 can be implemented in a client computing device while others are implemented on a server computing device.

General software 320 can include various applications, including an operating system 322, local programs 324, and a basic input output system (BIOS) 326. Specialized components 340 can be subcomponents of a general software application 320, such as local programs 324. Specialized components 340 can include payment card issuing module 344, dynamic code generation module 346, verification application 348, authorization module 350, and components that can be used for transferring data and controlling the specialized components, such as interface 342. In some implementations, components 300 can be in a computing system that is distributed across multiple computing devices or can be an interface to a server-based application executing one or more of specialized components 340.

Payment card issuing module 344 issues a payment card to a user. The payment card can be a credit card, debit card, gift card, store card, or other payment device. The payment card can have a payment card number (e.g., account number) or other identifier and the payment card can be associated with the user in a database. In some embodiments, the payment card can have an expiration date but in other embodiments, the payment card does not have an expiration date. The payment card can be associated with dynamic code generation module 346 and verification application 348.

Dynamic code generation module 346 can generate a code or token (e.g., 3 digit, 4 digit, letters) associated with the payment card. The dynamic code can change periodically (e.g., hourly, daily, weekly, monthly) or randomly. In a preferred embodiment, the dynamic code changes hourly so that the dynamic code cannot be discovered by a fraudster via multiple attempts. The dynamic code can also change upon receiving a triggering event or request. For example, if the information associated with a payment card has been compromised in a data breach, for example, a request can be sent to the dynamic code generation module 346 to change the dynamic code associated with the payment card. In some embodiments, dynamic code generation module 346 is owned or operated by a third party. When dynamic code generation module 346 changes the code associated with the payment card, dynamic code generation module 346 can send the updated code to verification application 348 and/or to the payment card issuer.

Verification application 348 can reside on a device associated with the user of the payment card. The verification application 348 can display the dynamic code to the user to provide to a merchant or website. For example, for CNP transactions, the user can input/provide/state an identifier of the payment card (e.g., payment card number, expiration date, user's name, address) and in place of the traditional CVV2, input/provide/state the code displayed on the verification application 348 at the time the user is requesting the transaction. For CP transactions, the user (or retailer) can input the dynamic code into an electronic device associated with the merchant (e.g., merchant computing device, point of sale device, kiosk, or terminal) such that the dynamic code can replace the traditional CVV1, or in the case of chip-enabled cards, simply provide an additional security measure. In some embodiments, the traditional CVV1 and CVV2 can be used in addition to the dynamic code.

In some embodiments, the user is required to authenticate to the device and/or the verification application 348 prior to accessing the verification application 348, providing additional security. For example, the user can authenticate to the device and/or verification application 348 by providing biometric information, a personal identification number, or a password. In some embodiments, verification application 348 can operated by the same party as dynamic code generation module 346. In some embodiments, verification application 348 can be operated by and integrated into an application associated with the payment card issuer. Verification application 348 can include information about the payment cards such as purchases, balances and previous dynamic codes. In other embodiments, verification application 348 provides only dynamic codes. Verification application 348 can provide dynamic codes for multiple payment cards and can include an indication of the time remaining (e.g., a countdown, watch, or timer) for each of the current dynamic codes. In some embodiments, multiple payment cards can be listed with a corresponding dynamic code and/or the countdown until the dynamic code changes on one tab of the application; in other embodiments, the user can select a payment card from the list of payment cards to view the dynamic code and/or the remaining time.

Authorization module 350 can receive a request for authorization for a transaction that uses the payment card. The request can be received from a remote computing device such as an electronic device associated with a merchant (e.g., point of sale) or a payment processor. The request can include an identifier of the payment card, an amount of the transaction (or estimated amount as in the case of a restaurant), and a verification code provided by the user. Authorization module 350 can identify the payment card using the identifier and determine whether there is sufficient funds or credit available or if there is any other reason the transaction should be denied. Authorization module 350 can compare the verification code with a value of the dynamic code at the time the transaction was requested. The dynamic code at the time of the transaction (i.e., when the merchant request authorization) can be requested/received from the dynamic code generation module 346.

Authorization module 350 can authorize the transaction when the verification code received by authorization module 350 matches the value of the dynamic code at the time of the transaction. The time of the transaction can be the time at which the merchant makes an authorization request for the transaction. In some embodiments, authorization module 350 denies the transactions when the verification code does not match the dynamic code. In other embodiments, when the verification code does not match the dynamic code, the dynamic code immediately prior to the dynamic code at the time of the transaction (or previous dynamic codes within a timeframe of the transaction) can be reviewed to determine whether the user missed the changing of the dynamic code by a predetermined timeframe (e.g., a few seconds) to account for delay in the payment processing systems or for the time between the user providing the dynamic code and the merchant requesting authorization. That way, a transaction will not be denied if timing was such that the dynamic code changed close to or at the same time the user was inputting the verification code. Authorization module 350 can send authorization or denial messages to the merchant or payment processing system.

When the dynamic code is generated by a remote computing device associated with a third party, authorization module 350 can request the dynamic code at the time of the transaction from the remote computing device to verify that the verification code matches the dynamic code. In other embodiments, the remote computing device constantly sends the dynamic code to authorization module 350 (e.g., the payment issuer) so that authorization module 350 (or a database) can check the value of the dynamic code at any time. In some embodiments, authorization module 350, a merchant device, or a payment processor sends the payment card identifier, the verification code, and the time of the transaction to the remote computing device and the remote computing device determines whether the verification code matches the value of the dynamic code at the time of the transaction. The remote computing device can send results to authorization module 350, merchant device or the payment processor.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
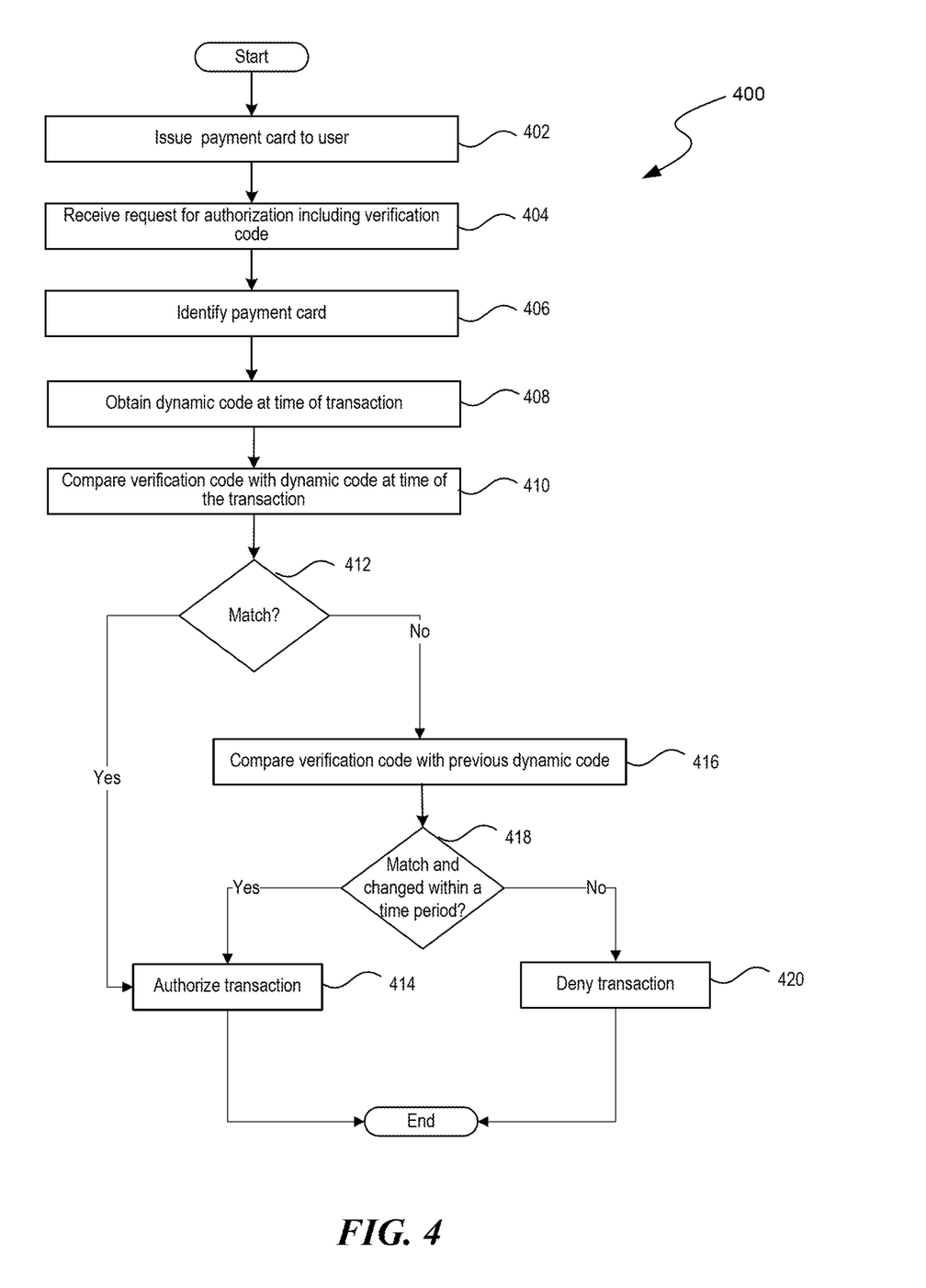
FIG. 4 is a flow diagram illustrating a process used in some implementations for authorizing a payment card transaction using a dynamic code.

FIG. 4 is a flow diagram illustrating a set of operations 400 for authorizing a payment card transaction using a dynamic code. Issuing operation 402 issues a payment card to a user. Receiving operation 404 receives a request for authorization. The authorization request can include an identifier of the payment card (e.g., account number), amount of the transaction, and a verification code. Identifying operation 406 can identify the payment card using the payment card identifier. Obtaining operation 408 can obtain a value of a dynamic code associated with the payment card at the time of the transaction. The dynamic code can be obtained from a generator of the dynamic codes (e.g., third party, internal server). Comparing operation 410 compares the verification code with the value of the dynamic code at the time of the transaction.

Decision operation 410 determines whether the verification code matches the dynamic code at the time of the transaction. When the verification code matches the dynamic code, decision operation 410 branches to authorizing operation 414 where the transaction is authorized. Authorizing operation 414 can send a message to the merchant or to a payment processor that the transaction is authorized. When the verification code does not match the dynamic code, decision operation 412 branches to comparing operation 416 where the verification code is compared with a previous dynamic code to determine whether the verification code matches the previous dynamic code. Decision operation 418 determines whether the verification code is the same as the previous dynamic code and whether the previous dynamic code changed to the dynamic code at the time of the transaction within a certain time period. When the verification code matches the previous dynamic code and when the previous dynamic code changed within a certain time period of the dynamic code, decision operation 418 branches to authorizing operation 414. When the verification does not match the previous transaction code or the previous transaction code did not change to the transaction code at the time of the transaction within the time period, decision operation 418 branches to denying operation 420 where the transaction is denied. Denying operation 420 can send a notification to the merchant and/or the payment processor of the denial. In some embodiments, a message is sent to the user's device alerting the user that the payment card transaction was denied.

Figure 5:
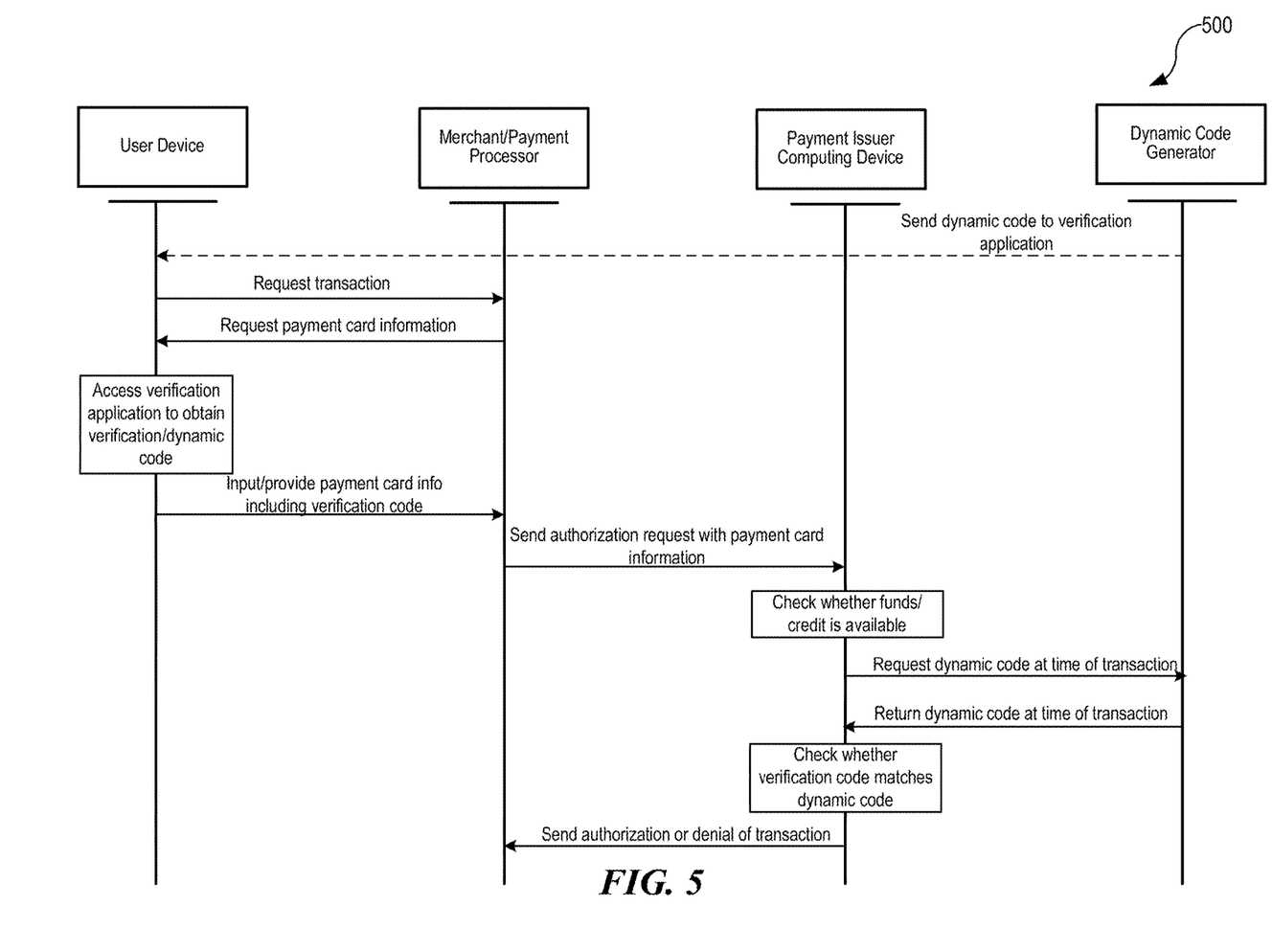
FIG. 5 is a sequence diagram illustrating a process used in some implementations for authorizing a payment card transaction using a dynamic code.

FIG. 5 is a sequence diagram illustrating a process used in some implementations for authorizing a payment card transaction using a dynamic code. As shown, the dynamic code generator can periodically, randomly, or upon request generate a code or token and send it to a verification application on a user device. The user device (or a different device associated with the user) can request a transaction from a merchant (e.g., at a website, retail location). The merchant can request payment card information from the user such as an account number, expiration date (if applicable), billing address, and verification code. The user can access the verification application on the user device to obtain the verification code (i.e., dynamic code). The user or user device can provide the payment card information, including the verification code, to the merchant (e.g., via the website, at a terminal or kiosk at the merchant location). The merchant or payment processor can send an authorization request with the payment card information to the payment issuer computing device. The payment issuer computing device can check whether the funds or credit are available for the user of the payment card and can request the dynamic code at the time of the transaction from the dynamic code generator. The dynamic code generator can return the value of the dynamic code at the time of the transaction. The payment issuer computing device can check whether the verification code matches the value of the dynamic code at the time of the transaction and send an authorization or denial of the transaction based on whether funds/credit is available and whether the verification code matches the dynamic code.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology.

In addition, the data structures and message structures can be stored or transmitted via a data transmission medium, such as a signal on a communications link. Various communication links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computerized method for dynamic code payment card verification using a computing device of a payment card issuer that issues a payment card to a user, a user device of the user and a remote server, wherein the remote server generates dynamic codes for the payment card and the user device includes a verification application associated with the payment card, comprising:

storing, by the computing device of the payment card issuer, a pre-determined time period, a user account of the user comprising an identifier of the payment card and a transaction history associated with the payment card;

associating, by the computing device of the payment card issuer, the payment card with the verification application of the user device, wherein the verification application of the user device includes a first dynamic code of the dynamic codes associated with the payment card and an indication of time remaining for the first dynamic code;

receiving, by the computing device of the payment card issuer from a remote computing device, a first request for authorization of a first transaction associated with the payment card, wherein the first request includes at least the identifier of the payment card and a first verification code, and a time of the first request;

identifying, by the computing device of the payment card issuer, the payment card using the identifier of the payment card for the first request;

transmitting, by the computing device of the payment card issuer and to the remote server, a second request for a second dynamic code, wherein the second request comprises the time of the first request and the identifier of the payment card;

receiving, by the computing device of the payment card issuer and from the remote server, the second dynamic code, wherein the second dynamic code from the remote server is associated with the time of the first request;

determining, by the computing device of the payment card issuer, whether the received first verification code matches the received second dynamic code by comparing the received first verification code with the received second dynamic code;

in response to the determining that the received first verification code matches the received second dynamic code, authorizing, by the computing device of the payment card issuer, the first transaction, wherein the authorizing further comprises storing information of the authorized first transaction including the second dynamic code;

receiving, by the computing device of the payment card issuer from the remote computing device, a third request for authorization of a second transaction associated with the payment card, wherein the third request includes at least the identifier of the payment card and a second verification code, and a time of the third request;

identifying, by the computing device of the payment card issuer, the payment card using the identifier of the payment card for the third request;

transmitting, by the computing device of the payment card issuer to the remote server, a fourth request for a third dynamic code, wherein the fourth request comprises the time of the third request and the identifier of the payment card;

receiving, by the computing device of the payment card issuer from the remote server, the third dynamic code, wherein the third dynamic code from the remote server is associated with the time of the third request;

determining, by the computing device of the payment card issuer, whether the received second verification code matches the received third dynamic code by comparing the received second verification code with the received third dynamic code;

in response to determining that the received second verification code does not match the received third dynamic code, determining, by the computing device of the payment card issuer, whether (A) the received second verification code matches the received second dynamic code and (B) the time of the third request of the second transaction is within the pre-determined time period from the time of the first request of the first transaction;

based on the determining that (A) the received second verification code matches the received second dynamic code and (B) the time of the third request of the second transaction is within the pre-determined time period from the time of the first request of the first transaction, authorizing, by the computing device of the payment card issuer, the second transaction; and in response to a breach event of the identifier of the payment card, receiving, by the computing device of the payment card issuer and from the remote server, a fourth dynamic code, wherein the verification application on the user device receives, from either the remote server or the computing device of the payment card issuer, the fourth dynamic code and an-indication of time remaining for the fourth dynamic code.

2. The computerized method of claim 1, further comprising:

operating, by the computing device of the payment card issuer, the verification application.

3. The computerized method of claim 1, wherein the verification application includes dynamic codes for multiple payment cards.

4. A non-transitory computer-readable storage medium for dynamic code payment card verification involving a computing device of a payment card issuer issuing a payment card to a user, a user device of the user and a remote server, wherein the remote server generates dynamic codes and the user device includes a verification application associated with the payment card, wherein the non-transitory computer-readable storage medium stores instructions that when executed by one or more processors of the computing device of the payment card issuer, cause the one or more processors to perform operations comprising:

storing a pre-determined time period, a user account of the user comprising an identifier of the payment card and a transaction history associated with the payment card;

associating the payment card with the verification application of the user device, wherein the verification application of the user device includes a first dynamic code of the dynamic codes associated with the payment card and an indication of time remaining for the first dynamic code;

receiving, from a remote computing device, a first request for authorization of a first transaction associated with the payment card, wherein the first request includes at least the identifier of the payment card and a first verification code, and a time of the first request;

identifying the payment card using the identifier of the payment card for the first request;

transmitting, to the remote server, a second request for a second dynamic code, wherein the second request comprises the time of the first request and the identifier of the payment card;

receiving, from the remote server, the second dynamic code, wherein the second dynamic code from the remote server is associated with the time of the first request;

determining whether the received first verification code matches the received second dynamic code by comparing the received first verification code with the received second dynamic code;

in response to the determining that the received first verification code matches the received second dynamic code, authorizing the first transaction, wherein the authorizing further comprises storing information of the authorized first transaction including the second dynamic code;

receiving, from the remote computing device, a third request for authorization of a second transaction associated with the payment card, wherein the third request includes at least the identifier of the payment card and a second verification code, and a time of the third request;

identifying the payment card using the identifier of the payment card for the third request;

transmitting, to the remote server, a fourth request for a third dynamic code, wherein the fourth request comprises the time of the third request and the identifier of the payment card;

receiving, from the remote server, the third dynamic code, wherein the third dynamic code from the remote server is associated with the time of the third request;

determining whether the received second verification code matches the received third dynamic code by comparing the received second verification code with the received third dynamic code;

in response to determining that the received second verification code does not match the received third dynamic code, determining whether (A) the received second verification code matches the received second dynamic code and (B) the time of the third request of the second transaction is within the pre-determined time period from the time of the first request of the first transaction;

based on the determining that (A) the received second verification code matches the received second dynamic code and (B) the time of the third request of the second transaction is within the pre-determined time period from the time of the first request of the first transaction, authorizing the second transaction; and in response to a breach event of the identifier of the payment card, receiving, from the remote server, a fourth dynamic code, wherein the verification application on the user device receives, from either the remote server or the computing device of the payment card issuer, the fourth dynamic code and an indication of time remaining for the fourth dynamic code.

5. The non-transitory computer-readable storage medium of claim 4, wherein the instructions that when executed by the one or more processors cause the one or more processors to perform additional operations comprising:

operating the verification application.

6. The non-transitory computer-readable storage medium of claim 4, wherein the verification application includes dynamic codes for multiple payment cards.

7. A system for dynamic code payment card verification involving a computing device of a payment card issuer issuing a payment card to a user, a user device of the user and a remote server, wherein the remote server generates dynamic codes and the user device includes a verification application associated with the payment card, wherein the system comprising:

one or more processors of the computing device of the payment card issuer; and a non-transitory computer-readable storage medium storing instructions that, when executed by the one or more processors, cause the one or more processors to perform operations comprising:

storing a pre-determined time period, a user account of the user comprising an identifier of the payment card and a transaction history associated with the payment card;

associating the payment card with the verification application of the user device, wherein the verification application of the user device includes a first dynamic code of the dynamic codes associated with the payment card and an indication of a first timer for the first dynamic code;

receiving, from a remote computing device, a first request for authorization of a first transaction associated with the payment card, wherein the first request includes at least the identifier of the payment card and a first verification code, and a time of the first request;

identifying the payment card using the identifier of the payment card for the first request;

transmitting, to the remote server, a second request for a second dynamic code, wherein the second request comprises the time of the first request and the identifier of the payment card;

receiving, from the remote server, the second dynamic code, wherein the second dynamic code from the remote server is associated with the time of the first request;

determining whether the received first verification code matches the received second dynamic code by comparing the received first verification code with the received second dynamic code;

in response to the determining that the received first verification code matches the received second dynamic code, authorizing the first transaction, wherein the authorizing further comprises storing information of the authorized first transaction including the second dynamic code;

receiving, from the remote computing device, a third request for authorization of a second transaction associated with the payment card, wherein the third request includes at least the identifier of the payment card and a second verification code, and a time of the third request;

identifying the payment card using the identifier of the payment card for the third request;

transmitting, to the remote server, a fourth request for a third dynamic code, wherein the fourth request comprises the time of the third request and the identifier of the payment card;

receiving, from the remote server, the third dynamic code, wherein the third dynamic code from the remote server is associated with the time of the third request;

determining whether the received second verification code matches the received third dynamic code by comparing the received second verification code with the received third dynamic code;

in response to determining that the received second verification code does not match the received third dynamic code, determining whether (A) the received second verification code matches the received second dynamic code and (B) the time of the third request of the second transaction is within the pre-determined time period from the time of the first request of the first transaction;

based on the determining that (A) the received second verification code matches the received second dynamic code and (B) the time of the third request of the second transaction is within the pre-determined time period from the time of the first request of the first transaction, authorizing the second transaction; and in response to a breach event of the identifier of the payment card, receiving, from the remote server, a fourth dynamic code, wherein the verification application on the user device receives, from either the remote server or the computing device of the payment card issuer, the fourth dynamic code and an indication of time remaining for the fourth dynamic code.

8. The system of claim 7, wherein the verification application includes dynamic codes for multiple payment cards.

* * * * *